United States Patent
McCarthy et al.

(10) Patent No.: US 8,398,336 B2
(45) Date of Patent: Mar. 19, 2013

(54) PIPE STRUCTURE AND METHODS OF LAYING AND USE OF A PIPELINE INCLUDING SUCH A PIPE STRUCTURE

(75) Inventors: Vincent George McCarthy, Kent (GB); Richard Harrison, Berkshire (GB); Dmytro Nalywajko, Surrey (GB)

(73) Assignee: Saipem UK Limited, Surrey (GB)

( * ) Notice: Subject to any disclaimer, the term of this patent is extended or adjusted under 35 U.S.C. 154(b) by 69 days.

(21) Appl. No.: 11/993,973

(22) PCT Filed: Jun. 15, 2006

(86) PCT No.: PCT/GB2006/002191
§ 371 (c)(1),
(2), (4) Date: Jan. 9, 2008

(87) PCT Pub. No.: WO2007/000569
PCT Pub. Date: Jan. 4, 2007

(65) Prior Publication Data
US 2009/0142138 A1   Jun. 4, 2009

(30) Foreign Application Priority Data

Jun. 27, 2005   (GB) .................................. 0513044.8

(51) Int. Cl.
*F16L 9/18* (2006.01)
(52) U.S. Cl. ......... 405/158; 138/112; 138/113; 138/114
(58) Field of Classification Search .................. 405/43, 405/158, 185.3, 184.5; 138/112–114; 166/241.4, 166/241.6, 241.7
See application file for complete search history.

(56) References Cited

U.S. PATENT DOCUMENTS

| | | | | |
|---|---|---|---|---|
| 3,840,035 A | * | 10/1974 | Lefever | 137/13 |
| 4,786,088 A | * | 11/1988 | Ziu | 285/123.1 |
| 4,830,091 A | * | 5/1989 | Dierke et al. | 165/134.1 |
| 5,458,441 A | * | 10/1995 | Barry | 405/170 |
| 5,678,609 A | * | 10/1997 | Washburn | 138/107 |
| 5,803,127 A | * | 9/1998 | Rains | 138/113 |
| 6,003,559 A | * | 12/1999 | Baker | 138/108 |
| 6,554,538 B2 | * | 4/2003 | Stockstill | 405/168.3 |
| 6,571,832 B1 | * | 6/2003 | Elliott | 138/108 |

FOREIGN PATENT DOCUMENTS

| | | |
|---|---|---|
| EP | 0 002 294 | 6/1979 |
| EP | 0 160 225 | 11/1985 |
| EP | 0 538 471 | 4/1993 |
| GB | 908926 | 10/1962 |

(Continued)

OTHER PUBLICATIONS

International Search Report Application No. PCT/GB2006/002191 dated Oct. 13, 2006.

*Primary Examiner* — Sunil Singh
*Assistant Examiner* — Benjamin Fiorello
(74) *Attorney, Agent, or Firm* — Buchanan Ingersoll & Rooney PC

(57) ABSTRACT

A pipe structure suitable for being laid in the sea comprises an inner pipe (2) for conveying fluid to be transported along the pipe structure and an outer pipe (3) around the inner pipe and supporting the inner pipe with space between the inner and outer pipes, the outer pipe having openings to allow water first to flow into the space between the inner pipe and the outer pipe and then to flow out of the space.

23 Claims, 1 Drawing Sheet

FOREIGN PATENT DOCUMENTS

| | | |
|---|---|---|
| GB | 2 306 127 | 4/1997 |
| GB | 2 317 222 | 3/1998 |
| JP | 10-078189 | 3/1998 |
| NL | 9000964 | 11/1991 |
| WO | WO 99/50581 | 10/1999 |
| WO | WO 2005/078325 | 8/2005 |

* cited by examiner

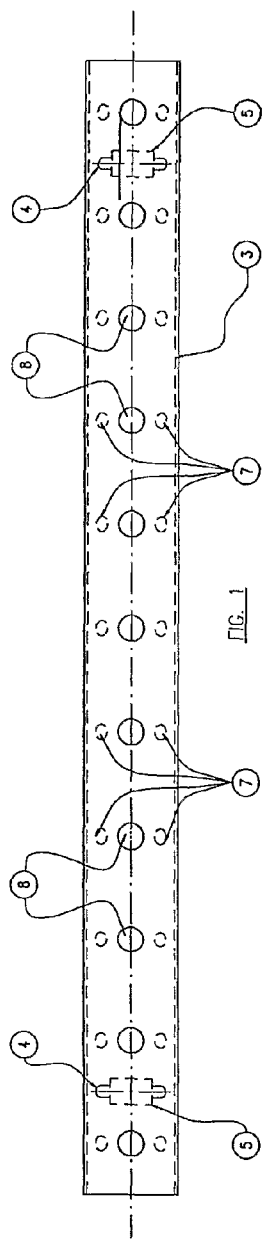
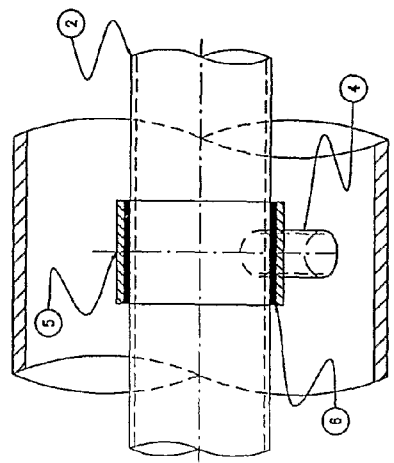
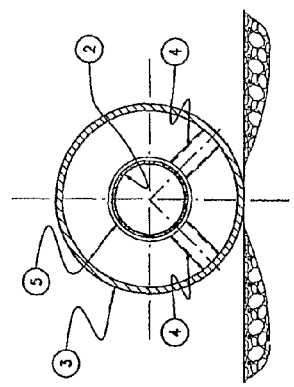
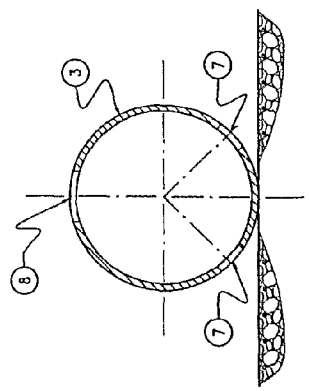

PIPE STRUCTURE AND METHODS OF LAYING AND USE OF A PIPELINE INCLUDING SUCH A PIPE STRUCTURE

BACKGROUND OF THE INVENTION

1. Field of the Invention

This invention relates to a pipe structure suitable for being laid from a vessel into the sea, to a pipeline including such a pipe structure and to methods of laying and using a pipeline including such a pipe structure.

2. Description of Related Art

As is well known, there is a requirement in the offshore oil and gas industry for a pipeline that can be laid on the seabed and is insulated so that the raw fluids extracted from a well can be transported through the pipeline without excessive change of temperature of those fluids. As a result there have been many proposals for pipe structures suitable for use in such pipelines. In such proposals a common structure comprises an inner pipe for conveying the fluid to be transported, insulating material around the inner pipe and an outer pipe around the insulating material. The insulating material provides thermal insulation of the inner pipe and is protected from loss of its insulating properties as a result of ingress of water by the outer pipe.

In some situations it is desirable, not to insulate the pipeline and inhibit any heat exchange of the surrounding sea with the fluid passing along the pipeline, but rather to promote heat exchange with the surrounding sea. Usually this is for the purpose of cooling the fluid in the pipeline although it may be for the purpose of warming the fluid (if the sea temperature is higher than the temperature of the fluid).

In one proposal for cooling the fluid passing along a pipeline a concrete trough, made up of a plurality of sections arranged in series, is placed on the seabed on a path along which a pipeline is to be laid, and a pipeline is then laid into the concrete trough. The concrete trough raises the pipeline off the seabed and is formed with cooling ducts through which seawater flows when the pipeline is in use, the flow of the seawater being promoted by the convection currents generated as a result of the temperature difference between the fluid conveyed along the pipeline and the surrounding seawater.

We have found that it is difficult to place the sections of the concrete trough in the correct position on the seabed and then to lay the pipeline correctly into the concrete trough. Also the concrete trough sections may shift relative to one another after the pipeline has been laid. Furthermore at the end of the life of the pipeline, the concrete trough sections have to be recovered separately if they are not to be left on the seabed.

SUMMARY

According to the invention there is provided a pipe structure suitable for being laid in the sea, the structure comprising an inner pipe for conveying fluid to be transported along the pipe structure and an outer pipe around the inner pipe and supporting the inner pipe with space between the inner and outer pipes, the outer pipe having openings to allow water first to flow into the space between the inner pipe and the outer pipe and then to flow out of the space.

Usually the pipe structure will be laid on the seabed, but in special cases it may be desirable for the pipeline to be above the seabed. For example, the pipe structure may be suspended above the seabed.

By adopting a pipe-in-pipe configuration for the pipe structure but then deliberately providing water passageways through the outer pipe to the inner pipe, we have found it possible to provide a pipe structure that allows good heat exchange with the fluid conveyed, in use, along the inner pipe, which can be raised above the seabed, and that is also able to be laid from a vessel as part of the overall pipe laying process.

The inner and outer pipes may be of square, rectangular or other cross-sections but it will usually be convenient that they are of circular cross-section. Whilst it is within the scope of the invention for the wall of the inner pipe to be eccentrically placed within the outer pipe and even in contact with and fixed, for example, by welding if the pipes are made of metal, it is generally preferred that the inner pipe is placed approximately in the middle of the outer pipe. Most preferably, the inner and outer pipes are of substantially circular cross-section and are concentric.

The inner pipe may be mounted within the outer pipe on supports. Preferably there are at least two supports. It is preferred that at least some of the supports allow longitudinal sliding movement of the inner pipe relative to the outer pipe. Such an arrangement facilitates the accommodation of differential amounts of thermal expansion or contraction of the inner pipe relative to the outer pipe.

At least some of the supports preferably each include a respective sleeve in which the inner pipe is allowed to slide. The sleeves may be held in a fixed position within the outer pipe by struts which extend between the sleeves and the outer pipe. Each sleeve may include a low friction lining in which the inner pipe is allowed to slide.

The space between the inner pipe and the outer pipe is preferably mainly open space. That allows free flow of water between the pipes. As already described, supports may stand between the outer and inner pipes so that the space is not entirely open but it is still preferable that the space remains substantially open.

The openings in the outer pipe may take any of a wide variety of forms. For example a portion of the outer pipe may be omitted along its whole length or a multiplicity of small perforations may be provided throughout the outer pipe. It is preferred, however, that the openings in the outer pipe are formed by apertures in the wall of the pipe. Preferably the apertures in the wall of the pipe have cross-sectional areas greater than 50 mm$^2$, and more preferably greater than 2000 mm$^2$. It should be understood that other smaller apertures may also be provided, but, by providing some apertures of significant size, obstruction to water flow through the apertures is reduced. It is also preferred that the apertures in the wall of the pipe have cross-sectional areas less than 200,000 mm$^2$ and more preferably less than 100,000 mm$^2$. Unduly large apertures reduce the structural strength of the outer pipe. The apertures are preferably circular, but may be of other shapes. The apertures may all be of one size but in an embodiment of the invention described below there are two sizes of aperture.

The apertures may be distributed on the outer pipe in a wide variety of ways. In a preferred arrangement the apertures include some apertures at a first circumferential region of the outer pipe and other apertures at a second circumferential region of the outer pipe, the first and second circumferential regions being spaced apart by more than 90 degrees, and more preferably the apertures include some further apertures at a third circumferential region of the outer pipe, the first, second and third circumferential regions being spaced apart from one another by more than 90 degrees. In an illustrated embodiment of the invention described below three regions are approximately equispaced around the circumference of the outer pipe and each circumferential region is therefore spaced from the adjacent regions by approximately 120 degrees. In the illustrated embodiment the apertures in the first circumferential region are bigger than the apertures in the second and third circumferential regions. Another option is to provide only a single row of apertures, for example, along the top of the pipe. In that case water flows into the space between the pipes through some apertures and out of the space through other apertures; such an arrangement is likely to provide a lower rate of heat transfer between the inner pipe and the sea but in some applications that may be desirable.

The apertures may be confined to only a limited length of the pipe structure, but it is preferred that they are distributed, preferably evenly distributed, along the length of the pipe structure. Conveniently, at each of a plurality of regions along the length of the pipe structure there is an aperture at a first circumferential region of the outer pipe and another aperture at a second circumferential region of the outer pipe, the first and second circumferential regions being spaced apart by more than 90 degrees. Preferably, at each of the plurality of regions along the length of the pipe structure there is also a further aperture at a third circumferential region of the outer pipe, the first, second and third circumferential regions being spaced apart from one another by more than 90 degrees. Such arrangements are shown in the illustrated embodiment described below and facilitate consistent performance of the pipe structure along its length.

If desired, one or more of the openings in the pipe may be adjustable. For example, an opening may be changeable in size or it may be closable. Such adjustment may be able to be made as a special step, involving, for example, external intervention after the pipe structure has been laid, or the structure may include an adjusting means for making the adjustment. Such an adjusting means may receive an adjusting signal from a controller which may be mounted on the pipe structure or may be at a remote location and may, for example, receive a signal indicating the temperature of the fluid in the inner pipe.

The cross-sectional area of the interior of the inner pipe is likely to be determined by the particular application for the pipeline and will typically be in the range of from 150 to 360,000 $mm^2$. The cross-sectional area of the interior of the outer pipe may be determined by a number of factors including the following: the diameter of the inner pipe; the height above the seabed at which it is desirable to support the inner pipe; the space desired between the inner and outer pipes; and the amount of water flow desired through the pipe structure. Typically the cross-sectional area of the interior of the outer pipe is at least twice the cross-sectional area of the exterior of the inner pipe. In an embodiment of the invention described below, the cross-sectional area of the interior of the outer pipe is of the order of (but less than) ten times the cross-sectional area of the exterior of the inner pipe.

The inner pipe is preferably made of a thermally conducting material. Typically the inner pipe is made of a metal alloy, for example of steel. The outer pipe is preferably made of a relatively strong material. Typically the outer pipe is made of a metal alloy, for example steel.

The present invention further provides a pipeline including a pipe structure as defined above along a part of its length. Usually the pipe structure of the invention will be applied to a small portion only of the overall length of the pipeline. The remainder of the pipeline will usually be of pipe-in-pipe structure, although this is not essential to the invention, and the inner pipe of the pipe structure of the invention will usually be the same size as the inner pipe of the rest of the pipeline; in such a case the outer pipe of the pipe structure of the invention may be the same size as, but may also be a different size from, the outer pipe of the rest of the pipeline; often the outer pipe of the pipe structure will be larger than the outer pipe of the rest of the pipeline. A bulkhead may be provided at the interface.

The pipeline may be laid from a reel but it is preferred that the pipeline comprises a plurality of pipe structures joined together in end-to-end relationship with some, but usually only a minority, of the pipe structures being of the kind having an outer pipe with openings as defined above.

The present invention still further provides a method of laying a pipeline from a vessel into the sea, in which a pipe structure according to the invention is laid from the vessel as part of the pipeline. As has already been indicated, there is advantage in being able to lay the pipe structure of inner and outer pipes from the vessel as it is laying the pipeline. Preferably the same apparatus on the vessel is used to lay both the special pipe structure according to the invention and other pipe structures forming part of the pipeline.

The present invention still further provides a method of using a pipeline that is laid in the sea and that includes along its length a pipe structure according to the invention, the method including passing fluid that is being transported along the pipeline through the inner pipe of the pipe structure, the temperature of the fluid being different from the temperature of the water in the region of the pipe structure, the temperature difference at least partly causing water to flow into the space between the inner pipe and the outer pipe, to exchange heat with the inner pipe and to flow out of the space between the inner pipe and the outer pipe.

BRIEF DESCRIPTION OF THE DRAWINGS

By way of example an embodiment of the invention will now be described with reference to the accompanying drawings, of which:

FIG. 1 is a plan view of a pipe structure embodying the invention;

FIG. 2 is a sectional view along the line A-A in FIG. 1;

FIG. 3 is a sectional view along the line B-B in FIG. 1; and

FIG. 4 is a side view to a larger scale of a portion of the pipe structure shown in section in FIG. 3.

DETAILED DESCRIPTION

Referring to the drawings, there is shown a pipe structure 1 comprising an inner pipe 2 and an outer pipe 3.

The inner pipe 2 (not shown in FIG. 2) is of circular cross-section and is of a standard design for the inner pipe of conventional pipe-in-pipe structure where insulation is provided around the inner pipe 2. In this case, however, the space between the inner pipe 2 and the outer pipe 3 is mainly simply open space.

The outer pipe 3 is also of circular cross-section and surrounds the inner pipe 2 which is concentrically mounted within the outer pipe by struts 4 and sleeves 5 lined with liners 6. The struts 4 extend radially between the inner surface of the outer pipe 3 and the outer surfaces of the sleeves 5. In the example shown there are a pair of struts 4 in each end region of the outer pipe serving to support a respective sleeve 5 at each end region.

The inner pipe 2 passes through the sleeves 5 and is allowed to slide within the sleeves, with the liners 6 providing a low friction contact with the inner pipe 2.

The outer pipe 3 is provided with a series of apertures distributed along its length. In the drawings eleven sets of circular apertures are shown evenly spaced along the length of the pipe structure. Each set of apertures comprises a pair of smaller apertures 7 on opposite sides of the outer pipe in a lower region of the outer pipe and a larger aperture 8 in the top of the pipe. In the example shown the apertures 7 and 8 of each set are circumferentially spaced from one another by 120 degrees. The apertures provide passages for water to pass through the outer pipe allowing flow of water into or out of the space between the inner pipe 2 and the outer pipe 3. It will be understood that in FIGS. 2 and 3, but not in the other drawings, the pipe structure 1 is shown resting in position on the seabed.

In a particular example of the invention the inner and outer pipes, the struts 4 and sleeves 5 (apart from the liners 6) are made of various steels, and the liner 6 is made of a suitable low friction material. In that example, some of the dimensions of the pipe structure are as follows:

| | |
|---|---|
| length of pipe structure: | 11 m |
| outside diameter of inner pipe 2: | 324 mm |
| outside diameter of outer pipe 3: | 914 mm |
| outside diameter of sleeves 5: | 406 mm |
| diameter of larger apertures 8: | 250 mm |
| diameter of smaller apertures 7: | 150 mm |

Each pipe structure 1 can be joined in series to another, similar, pipe structure 1, by welding the inner and outer pipes of each structure together and in that way a desired length of pipeline of this form can be manufactured. The welding of the pipe structures 1 to one another can be carried out as the pipeline is being laid by a vessel in a manner known per se. At one or both ends of the series of pipe structures 1, the structures are welded to an insulated pipe-in-pipe structure which may be of conventional design. A bulkhead may be provided at the joint and either the bulkhead or a separate frusto-conical adaptor may be designed to accommodate any differences in diameter of pipes that are joined together The pipe structures 1 are able to be laid from the vessel by the same laying apparatus as lays the conventional pipe-in-pipe structure; often the outer pipes of the pipe structures 1 will be of larger diameter than the outer pipes of the insulated pipe-in-pipe structure and some adjustments may have to be made to the pipe laying apparatus to enable it to lay the pipe structures 1.

The pipe structures 1 are laid on the seabed in the orientation shown in FIGS. 2 and 3. In the example described, hot fluid passes through the inner pipe 2 in use and the pipe structures 1 are used to cool the fluid. In use, the inner pipe 2 is heated by the hot fluid passing through the inner pipe 2 and the water immediately surrounding the inner pipe 2 is in turn heated by the inner pipe generating convection currents in the water. As a result water is caused to be drawn into the space between the inner pipe 2 and the outer pipe 3 through the smaller apertures 7 in a lower region of the outer pipe and to leave that space through the larger apertures 8. The flow of water through the structure thereby removes heat from the hot fluid passing through the inner pipe 2, cooling the fluid.

The invention claimed is:

1. A pipe structure suitable for being laid in water, the structure comprising an inner pipe for conveying fluid to be transported along the pipe structure and an outer pipe around the inner pipe and supporting the inner pipe with space between the inner and outer pipes, the outer pipe having openings arranged to be open to the water when laid to allow water first to flow into the space between the inner pipe and the outer pipe and then to flow out of the space into an area around the outer pipe, wherein the inner pipe is mounted within the outer pipe on supports, at least some of the supports allowing longitudinal sliding movement of the inner pipe relative to the outer pipe, and at least some of the supports each include a respective sleeve in which the inner pipe is allowed to slide.

2. A pipe structure according to claim 1, in which the inner and outer pipes are of substantially circular cross-section and are concentric.

3. A pipe structure according to claim 1, in which the sleeves are held in a fixed position within the outer pipe by struts which extend between the sleeves and the outer pipe.

4. A pipe structure according to claim 1, in which each sleeve includes a low friction lining in which the inner pipe is allowed to slide.

5. A pipe structure according to claim 1, in which the openings in the outer pipe are formed by apertures in the wall of the pipe.

6. A pipe structure according to claim 5, in which at least some of the apertures in the wall of the pipe have cross-sectional areas in the range of 50 $mm^2$ to 200,000 $mm^2$.

7. A pipe structure according to claim 5, in which the apertures include some apertures at a first circumferential region of the outer pipe and other apertures at a second circumferential region of the outer pipe, the first and second circumferential regions being spaced apart by more than 90 degrees.

8. A pipe structure according to claim 7, in which the apertures include some further apertures at a third circumferential region of the outer pipe, the first, second and third circumferential regions being spaced apart from one another by more than 90 degrees.

9. A pipe structure according to claim 8, in which the apertures in the first circumferential region are bigger than the apertures in the second and third circumferential regions.

10. A pipe structure according to claim 5, in which the apertures are distributed along the length of the pipe structure.

11. A pipe structure according to claim 10, in which at each of a plurality of regions along the length of the pipe structure there is an aperture at a first circumferential region of the outer pipe and another aperture at a second circumferential region of the outer pipe, the first and second circumferential regions being spaced apart by more than 90 degrees.

12. A pipe structure according to claim 11, in which at each of the plurality of regions along the length of the pipe structure there is also a further aperture at a third circumferential region of the outer pipe, the first, second and third circumferential regions being spaced apart from one another by more than 90 degrees.

13. A pipe structure according to claim 1, in which the cross-sectional area of the interior of the inner pipe is in the range of from 150 to 360,000 $mm^2$.

14. A pipe structure according to claim 1, in which the cross-sectional area of the interior of the outer pipe is at least twice the cross-sectional area of the exterior of the inner pipe.

15. A pipeline including a pipe structure according to claim 1 along a part of its length.

16. A pipeline according to claim 15, including a plurality of said pipe structures joined together in end-to-end relationship.

17. A method of laying a pipeline from a vessel into water, in which a pipe structure comprises an inner pipe for conveying fluid to be transported along the pipe structure and an outer pipe around the inner pipe and supporting the inner pipe with space between the inner and outer pipes, the outer pipe having openings arranged to be open to the water when laid to allow water first to flow into the space between the inner pipe and the outer pipe and then to flow out of the space into an area around the outer pipe, wherein the inner pipe is mounted within the outer pipe on supports, at least some of the supports allowing longitudinal sliding movement of the inner pipe relative to the outer pipe, the method comprising laying the pipe structure from the vessel as part of the pipeline.

18. A method according to claim 17, in which the pipeline comprises a plurality of said pipe structures joined together in end to end relationship.

19. A method according to claim 18, in which other pipe structures are laid by the same apparatus on the vessel as said pipe structures.

20. A method of using a pipeline that is laid in water and that includes along its length a pipe structure according to claim 1, the method including passing fluid that is being transported along the pipeline through the inner pipe of the pipe structure, the temperature of the fluid being different from the temperature of the water in the region of the pipe structure, the temperature difference at least partly causing water to flow into the space between the inner pipe and the outer pipe, to exchange heat with the inner pipe and to flow out of the space between the inner pipe and the outer pipe.

21. A method according to claim 20, in which water flows into the space between the inner pipe and the outer pipe through lower regions of the outer pipe and flows out of the space between the inner pipe and the outer pipe through upper regions of the outer pipe.

22. A method according to claim 21, in which the water flows out of the space between the inner pipe and the outer pipe through the uppermost regions of the outer pipe.

23. A pipe structure for being laid in water, the structure comprising an inner pipe for conveying fluid to be transported along the pipe structure and an outer pipe around the inner pipe and supporting the inner pipe with mainly open space between the inner and outer pipes, the outer pipe having openings arranged to be open to the water when laid to allow water first to flow into the space between the inner pipe and the outer pipe and then to flow out of the space into an area around the outer pipe, wherein the inner pipe is mounted within the outer pipe on supports, at least some of the supports allowing longitudinal sliding movement off the inner pipe relative to the outer pipe, and at least some of the supports each include a respective sleeve in which the inner pipe is allowed to slide.

* * * * *